Sept. 21, 1937.    L. C. READ    2,093,818
SHOOTING RANGE APPARATUS
Filed Oct. 5, 1935    3 Sheets-Sheet 1
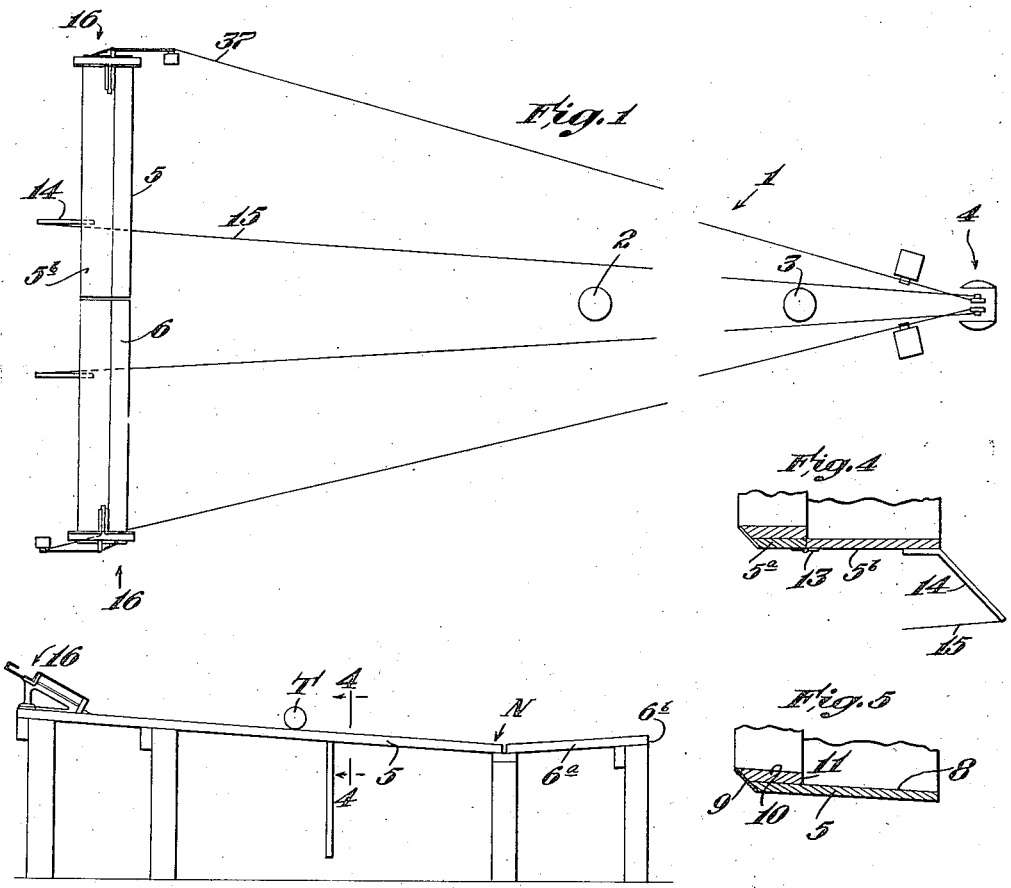

Sept. 21, 1937.  L. C. READ  2,093,818
SHOOTING RANGE APPARATUS
Filed Oct. 5, 1935  3 Sheets-Sheet 2
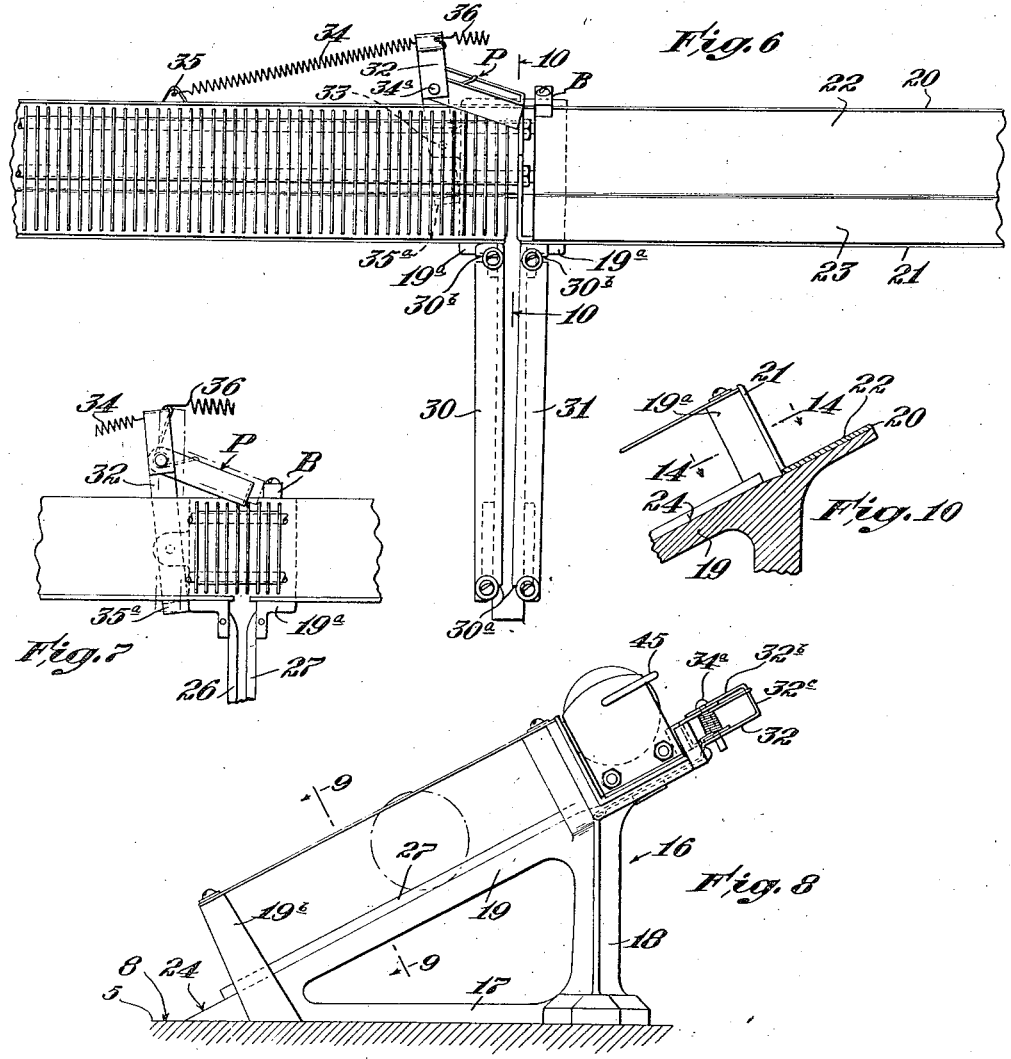
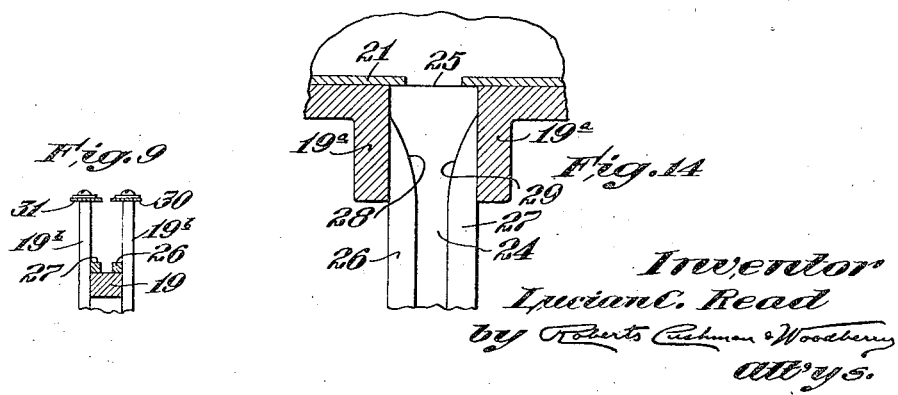

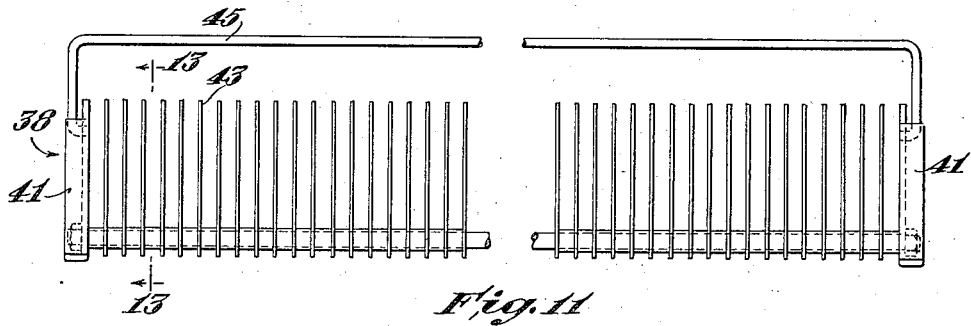

Patented Sept. 21, 1937

2,093,818

UNITED STATES PATENT OFFICE 2,093,818

SHOOTING RANGE APPARATUS

Lucian C. Read, Framingham Center, Mass.

Application October 5, 1935, Serial No. 43,707

13 Claims. (Cl. 124—16)

This invention pertains to shooting range apparatus and more particularly to means designed to cause targets to move transversely across the range for practice or competitive shooting, and has for its principal object the provision of means for delivering disk-like targets and guiding them so that they roll with varying velocity along their peripheral edges transversely across the range.

Further objects of the invention are to provide apparatus for supporting and guiding the targets as delivered by the trap proper; to provide for delivering a series of targets in succession at such intervals as may be desired; to provide a trap comprising a magazine designed to hold a substantial number of targets so that they may be delivered accurately, one at a time, therefrom; to provide a trap which may be manipulated from any desired distance; and to provide trap apparatus of simple and durable construction.

Other objects and advantages of the invention will be pointed out hereinafter in detailed description and by reference to the accompanying drawings, in which:

Fig. 1 is a fragmentary, diagrammatic plan view of a shooting range equipped with the improved trap apparatus;

Fig. 2 is an elevation, to somewhat larger scale, from the left-hand side of Fig. 1, illustrative of a target trap apparatus designed to deliver targets to move in opposite directions across the line of fire;

Fig. 3 is a view similar to Fig. 2, but illustrating target trap apparatus designed to deliver targets in one direction only across the field;

Fig. 4 is a fragmentary section substantially on the line 4—4 of Fig. 2;

Fig. 5 is a section similar to Fig. 4, but illustrating a modification;

Fig. 6 is a fragmentary plan view of the target trap proper, showing the magazine in position for delivering the first target therefrom;

Fig. 7 is a fragmentary plan view, to smaller scale, showing the magazine as having been moved a substantial distance along its supporting guide;

Fig. 8 is an end elevation of the trap proper, viewed from the right-hand side of Fig. 6;

Fig. 9 is a section substantially on the line 9—9 of Fig. 8;

Fig. 10 is a fragmentary vertical section substantially on the line 10—10 of Fig. 6;

Fig. 11 is a fragmentary front elevation of the magazine removed from the trap;

Fig. 12 is an end elevation of the magazine of Fig. 11;

Fig. 13 is a vertical section on the line 13—13 of Fig. 11;

Fig. 14 is a fragmentary section, to larger scale, substantially on the line 14—14 of Fig. 10;

Fig. 15 is a diagrammatic view illustrating a modified construction in which the magazine is electrically actuated; and Fig. 16 is a further modification illustrating means for moving the magazine automatically.

Referring to the drawings and more particularly to Figs. 1 to 5 inclusive, the numeral 1 designates a shooting or rifle range having stations 2 and 3 at which, alternatively, a marksman may be stationed,—and a control station 4 at which is located means actuable by an operator or by automatic mechanism for releasing the targets so that they may travel transversely of the length of the range in view of the marksman.

The improved trap apparatus comprises an elongate support, which as illustrated in Figs. 1 and 2, comprises the inclined elongate target guideways 5 and 6 mounted at the proper elevation upon legs or other supports 7 and preferably so as to extend substantially perpendicular to the length of the range. In a preferred construction, as illustrated in Fig. 5, the guideway members 5 and 6 are not only inclined from their outer ends downwardly toward an intermediate meeting point M, but their upper surfaces 8 inclined rearwardly and downwardly away from the marksman's stations 2 and 3. Preferably the forward edges of the guideways 5 and 6 are downwardly beveled, as indicated at 9, Fig. 5, so as to deflect downwardly a bullet which might strike the edge of the guideway. If desired, guideways 5 and 6 may be furnished with relatively narrow cleats 10 at their forward edges, the rear edges of the cleats, as indicated at 11, forming guide surfaces with which the rolling targets may contact as they travel downwardly along the upper surfaces 8 of the guides 5 and 6.

In a modified construction, as illustrated in Fig. 4, the guideways 5 and 6 each includes a stationary portion 5ª and a movable portion 5ᵇ hinged to the stationary portion by a spring hinge 13 which tends to hold the part 5ᵇ in alignment with the part 5ª. In this arrangement the upper surface of the part 5ᵇ on which the targets T roll may be nominally horizontal but this portion 5ᵇ may be tipped downwardly and rearwardly about the axis of the spring hinge by means of an arm 14 projecting downwardly from the part 5<sup>b</sup> and a flexible cord or chain 15 which extends back to the operator's position 4. This arrangement facilitates the dumping of broken targets which may fall on the guideway. However, in the arrangement shown in Fig. 5, wherein the guideway is nominally inclined away from the marksman; the targets tend to roll toward the rear edge of the guideway by reason of the inclination of the surface 8, and most of the broken parts fall, without further assistance, from the rear edge of the guideway.

The apparatus illustrated in Figs. 1 and 2 is designed to deliver targets T from either end so that such targets roll down toward the lowest point M where the guides 5 and 6 meet. If a target is not broken before it reaches this low point it tends to roll up the opposite incline until its momentum is dissipated and then either to roll back toward the low point (oscillating back and forth), or else to roll off the rear edge of the guideway.

In Fig. 3 a slight modification is illustrated wherein, while the guide 5 is similar to that of Fig. 2, the guide 6<sup>a</sup> terminates at the point 6<sup>b</sup>, a short distance, for example two feet, beyond the low point N of the guideway 5. This arrangement is designed to have targets T delivered at the high end of the guideway 5 only, such targets rolling down the latter and then up the inclined guideway 6<sup>a</sup>, and if not broken, dropping from off the elevated end of the guideway 6<sup>a</sup>.

For delivering the targets so that they may roll on their edges longitudinally of the guideways or guideway, an improved trap apparatus 16 is mounted at the more elevated end of each of the guideways 5 and 6, as illustrated in Figs. 1 and 2, or at the elevated end of the guideway 5, only, as illustrated in Fig. 3. This improved trap is illustrated more in detail in Figs. 6 to 14 inclusive, and has a supporting frame which may if desired be of cast iron and includes a base portion 17 provided with openings for bolts or screws by which it may be secured to the guideway. Integral with this base member is an upstanding post 18, which together with the base member furnishes a support for an inclined runway portion 19. The frame also includes a magazine slideway, which may, for example, consist of an elongate piece of angle iron of suitable dimensions mounted adjacent to the upper end and comprising the flanges 20 and 21 disposed substantially at right angles to each other, the angle iron being suitably secured to the lower part of the frame by bolts or other means rigidly holding it in position. This slideway for the magazine may be of any suitable length but for practical purposes it has been found that a length of approximately thirty inches is desirable. The upper portion of the casting on which rests the flange 20 of the slideway is inclined so that the upper surface 22 (Fig. 10) of the flange 20 inclines at an angle preferably of approximately 30°. The inner surfaces 22 and 23 of the angle iron constitute guides for the magazine along which the latter may move step by step, as hereinafter described, so as to deliver targets to the guideway. Preferably the upper surface 24 of the member 19 is smooth and disposed substantially in the same plane as the surface 22 of the slideway, and this surface 24 extends downwardly substantially to the upper surface 8 of the target guide with which the trap is associated. Preferably the frame has a pair of upstanding lugs 19<sup>a</sup> (Fig. 14) disposed at the opposite sides of the runway member 19, to which the slideway is secured.

At a point between the lugs 19<sup>a</sup> the flange 21 is furnished with a vertical slot or gate 25 (Fig. 14) affording a passage through which a target within the magazine may escape and roll down on its edge along the upper surface 24 of the member 19. In order to guide the target as it rolls along this runway surface, cleat members 26 and 27 are secured to the upper surface of the member 19 in parallel relation and with their inner edges spaced apart to form a groove-like runway for the targets. To facilitate the entrance of the targets into this runway groove the upper ends of the cleats 26 and 27 are preferably beveled or flared, as shown at 28 and 29 respectively. Further in order to guide the targets as they pass down the inclined runway, the frame is preferably furnished with a pair of upstanding posts 19<sup>b</sup> near the lower end of the part 19, and spaced guide bars 30 and 31 are secured to the posts 19<sup>b</sup> and to the lugs 19<sup>a</sup> respectively. These guide bars 30 are preferably transversely slotted at their points of attachment to the lugs and posts so that they may be swung laterally to a slight extent, thereby to permit adjustment so that the targets may be caused to leave the runway in an accurately predetermined direction. For example, if the apparatus is exposed to a strong wind and it be desired to compensate for the effect of the wind on the moving targets as they travel along the guideways, these guide bars 30 and 31 may be swung in the proper direction to impart a compensating directional movement to the targets as they roll down the runway.

In order to move the magazine lengthwise of its slideway there is provided a pawl and ratchet mechanism comprising a lever 32 (Figs. 6 and 7) pivotally secured at the point 33 upon a lug projecting from the frame and this lever is nominally held in the position indicated in Fig. 6 by means of a coil spring 34 secured at one end to the lever and at its other end to a lug 35 projecting from the rear edge of the slideway. The forward end 35<sup>a</sup> of the lever 32, when in this position, engages a fixed part of the frame so as to limit swing of the lever in the counterclockwise direction, as viewed in Fig. 6. For operatively swinging the lever in the opposite direction connections lead from the outer end of the lever to the operator's position 4. Preferably such connections comprise a spring 36 connected at one end to the lever and at the other end to a cord or chain 37 reaching to the operator's position. Thus by pulling the cord or chain 37 the lever 32 may be swung in a clockwise direction. At actuating pawl P is pivotally secured by means of a pin 34<sup>a</sup> to the lever 32 at a point intermediate the pivot 33 and the outer end of the lever. This pawl P preferably comprises a length of sheet metal bent to substantially U-form so as to have the parallel legs 32<sup>a</sup> and 32<sup>b</sup> united by the transverse portion 32<sup>c</sup>, the latter acting as the pawl proper. A coil spring 35 embraces the pin 34<sup>a</sup> and tends to swing the pawl in a clockwise direction, as viewed in Fig. 6. A fixed stop block B is secured to the upper part of the slideway and lies in the path of the pawl P so as to limit the movement of the latter to the right, as viewed in Fig. 6, the maximum movement of the pawl being such as to move the magazine just sufficiently to deliver one target to the runway for each stroke of the pawl.

The magazine 38, in a preferred construction, as illustrated more in detail in Figs. 11, 12 and 13, comprises a pair of end members 39 preferably made from sheet metal and each having a bottom flange 40 and a side flange 41, said flanges being adapted to bear against the inner surfaces 22 and 23, respectively, of the slideway. These end members 39 are united by means of a pair of rods 42 screw threaded at their ends for the reception of nuts which bear against the outer surfaces of the end members 39. Between the end members is arranged a series of partition plates 43 preferably of sheet metal, such plates being strung upon the rods 42 and being held in spaced relation by means of spacer members 44 (Fig. 13) interposed between adjacent plates, the rear edges of the partition plates 43 constituting spaced ratchet teeth for engagement by pawl P. Conveniently the spacer members 44 consist of strips of sheet metal of appropriate width having their opposite ends arranged to embrace the rods 42 and bent upwardly into contact with the under surface of the transverse portion of the spacer. However, spacers of other types, for example castings, may be used if desired. Preferably the end members 39 are provided with apertures for the reception of the opposite ends of a bail 45, by means of which the magazine may be carried. Such a bail also when turned downwardly to the position indicated in Fig. 12 acts to retain targets in position within the magazine.

The disk-like targets T are disposed in the recesses between adjacent partitions 43 of the magazine. At the start of the operation the filled magazine occupies a position just to the left of that indicated in Fig. 6, with the edges of its targets bearing against the inner surface of flange 21 of the slideway. Since the bottom or floor of each recess, as defined by its particular spacer member 44 is inclined when the magazine is disposed in the slideway, the targets tend to roll out except as prevented by the flange 21. Assuming that a marksman is stationed at either the point 2 or 3 and is ready to shoot, the pawl P is actuated to move the magazine to the position of Fig. 6. The target in the first recess of the magazine immediately rolls out of its recess through the gate 25 into the runway and thus, gaining momentum, rolls out onto the upper surface of the guide 5 or 6 as the case may be and then continues to roll along the latter in a path extending transversely across the range and with its face substantially perpendicular to the length of the range until it is either shattered by a bullet or it runs off either from the end of the guideway or off of the rear edge of the latter. As frequently as desired the operator at the station 4 may pull on one of the cords 37, thus causing the pawl P to engage the edge of one of the partitions 43 of the magazine, such edges of the partitions acting as ratchet teeth, as above noted, so that as the pawl is moved to the right, as viewed in Fig. 6, the target is racked along its slideway a distance just sufficient to bring the next recess in register with the window 25, thereupon the next target is freed so that it escapes down the runway. This operation may be continued until the magazine is empty, it being noted that as the magazine is gradually emptied it moves in the slideway to the right, as viewed in Fig. 6, on which it is supported, and that when it is completely empty it may be replaced merely by dropping a filled magazine into the left-hand portion of the slideway.

While the mechanical arrangement involving the actuating cord 37 forms a simple construction and one which is useful for the purpose, it is within the scope of the invention to provide other means for accomplishing this result. For example, in Fig. 15, the pawl-actuating spring 36 is shown as connected to the core 46 or a solenoid 47, the latter having windings connected by conductors to a battery 48, said conductors also leading to a push button switch 49 disposed at the operator's station 4. With this arrangement the mere pressure of the button 49 will energize the solenoid and thus move the pawl P so as to rack the magazine forwardly. In Fig. 16 a somewhat similar arrangement is illustrated but with the further change that instead of the manually actuated switch button 49, there is provided a cam 50, which may be driven by any suitable form of motive power and which automatically closes the switch 51 at regular or irregular intervals according to the contour of the cam.

While certain desirable embodiments of the invention have been illustrated by way of example, it is to be understood that the invention is not necessarily limited thereto but is inclusive of any modifications and equivalent arrangements as well as substitutions of material such as fall within the scope of the appended claims.

I claim:

1. Shooting range apparatus for use with targets capable of rolling, said apparatus including means providing an elongate guideway, and a trap comprising an elongate magazine movable relatively on the guideway, said magazine having a series of recesses each for the reception of a target, and means operative to move the magazine relatively to the guideway thereby in succession to release targets from the magazine, and means operative to impart momentum to a released target to impel it along the guideway.

2. Shooting range apparatus for use with disk-like targets capable of rolling on their edges, said apparatus including means providing an elongate guideway, and a trap comprising an inclined runway leading to the guideway, the trap also including an elongate magazine movable transversely of the runway, and means for moving the magazine thereby to release successive targets to roll down the runway onto the guideway.

3. Shooting range apparatus for use with disk-like targets, said apparatus comprising means providing an elongate guideway which slopes gradually from its opposite ends towards an intermediate point, and traps operative to deliver targets to the guideway adjacent to its opposite ends respectively so that the targets may roll from such ends toward the middle of the guideway, each trap comprising a magazine having a series of recesses for the reception of targets, and means for releasing targets in succession from said recesses.

4. Shooting range apparatus for use with targets capable of rolling, said apparatus including means providing an elongate guideway comprising a relatively long sloping portion and a relatively short sloping portion inclined upwardly from the lower end of the longer portion, and a trap device operative to deliver targets to the upper end of the longer portion of the guideway so that they may roll down the latter and up the opposite sloping portion, said trap device comprising a movable magazine having therein recesses for a plurality of targets, and means operative to move the magazine thereby to deliver successive targets to the guideway.

5. Shooting range apparatus for use with targets capable of rolling, said apparatus comprising means providing an elongate sloping guideway which extends transversely across the range and constructed and arranged to guide the rolling targets in a path in which, while fully exposed to view of the marksman, they cross the range substantially perpendicular to the length of the latter, and a trap device operative to deliver a target to the elevated end portion of the guideway so that it will roll uninterruptedly down the guideway toward the lower part of the latter and transversely across the range while being shot at, said trap device comprising a movable target magazine, and means operative to move the magazine thereby to deliver targets in succession to the guideway.

6. Target apparatus for use with targets capable of rolling, said apparatus comprising an elongate support along which targets may roll, and a trap for delivering targets to the support, the trap comprising a magazine for targets having a series of recesses each adapted to receive a target, said recesses being open at one point at least for delivery of targets, a closure element normally closing the series of recesses in the magazine, said closure element having a gate therein, and means for relatively moving the parts thereby to permit escape of targets from the respective recesses of the magazine through said gate in the closure member.

7. Target apparatus comprising a target magazine and a slideway for the magazine, said slideway having a closure wall, said closure wall having a gate therein, the magazine comprising spaced partitions defining recesses between them each for a single target, means providing a floor for each recess the floors of said recesses inclining toward said closure wall, and means operative to move the magazine step by step along the slideway thereby successively to register its recesses with the gate.

8. Target apparatus for use with disk-like targets comprising a target magazine and a slideway for the magazine, said slideway having a floor and a closure wall provided with a gate, the magazine having a series of spaced vertical partitions defining recesses each for a single target, each recess having a floor which is inclined toward the closure wall of the slideway when the magazine is disposed in the latter, and means operative to move the magazine step by step so as to dispose successive recesses in registry with the gate.

9. Target apparatus for use with disk-like targets comprising a target magazine and a slideway for the magazine, said slideway having a closure wall provided with a gate, the magazine having a series of target receiving recesses, each recess having a floor which inclines toward the closure wall of the slideway when the magazine is disposed in the latter, a pawl engageable with elements of the magazine for racking the latter along the slideway, stop means operative to limit individual step movements of the magazine to a distance equalling the spacing of the recesses, and means for actuating the pawl.

10. Target apparatus for use with disk-like targets comprising a target magazine and a slideway for the magazine, said slideway having a closure wall provided with a gate, the magazine having a series of spaced partitions defining target receiving recesses, each recess having a floor which is inclined toward the closure wall of the slideway when the magazine is disposed in the latter, and a pawl for moving the magazine along the slideway, the edges of the partitions of the magazine constituting ratchet teeth for engagement by the pawl, and means for moving the pawl to advance the magazine step by step and thereby successively to register its recesses with the gate in the closure wall.

11. Target apparatus for use with disk-like targets comprising a support provided with a substantially rectilinear downwardly inclined runway, a slideway for a magazine disposed at the upper end of the runway and extending transversely of the latter, a magazine in the slideway designed to hold targets in coaxial relation with the axis of the targets substantially parallel to the path of magazine movement, and means operative to move the magazine step by step along the slideway, the parts being so designed and arranged that at the completion of each advance step of the magazine a target escapes from the latter in position to roll down the runway.

12. Target apparatus for use with disk-like targets comprising a support provided with an inclined runway, a slideway for a magazine disposed at the upper end of the runway and extending transversely of the latter, said slideway having a wall provided with a gate at the upper end of the runway, guide means at opposite sides of the runway operative to guide a target rolling down the runway, and a magazine operative to hold targets in coaxial relation, and means operative to move the magazine along said slideway in a path substantially parallel to the axes of the targets within the magazine thereby to deliver targets one after another through said gate to roll down the runway.

13. Target apparatus comprising a support provided with an inclined runway and an adjustable windage guide associated with the runway and operative to determine the direction of a target rolling down the runway, and means operative to deliver targets to the top of the runway to roll down the latter.

LUCIAN C. READ.